United States Patent
Singh et al.

(10) Patent No.: US 7,310,119 B1
(45) Date of Patent: Dec. 18, 2007

(54) ADAPTIVE CIRCUIT FOR Y-C SEPARATION

(75) Inventors: Rahul Singh, Austin, TX (US); Daniel O. Gudmundson, Dripping Springs, TX (US); James A. Antone, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 463 days.

(21) Appl. No.: 10/862,685

(22) Filed: Jun. 7, 2004

(51) Int. Cl.
*H04N 9/78* (2006.01)

(52) U.S. Cl. ................................ 348/666; 348/667

(58) Field of Classification Search ......... 348/663–670
See application file for complete search history.

(56) References Cited

U.S. PATENT DOCUMENTS

| | | | | |
|---|---|---|---|---|
| 4,994,906 | A * | 2/1991 | Moriwake | 348/664 |
| 5,264,923 | A * | 11/1993 | Bhang | 348/665 |
| 5,367,342 | A * | 11/1994 | Bang | 348/667 |
| 5,508,753 | A * | 4/1996 | Hatano | 348/665 |
| 6,462,790 | B1 | 10/2002 | Lowe et al. | |
| 2002/0140866 | A1 | 10/2002 | Edwards et al. | |
| 2002/0149702 | A1 | 10/2002 | Satoh | |
| 2003/0071921 | A1 | 4/2003 | Tanigawa | |

* cited by examiner

*Primary Examiner*—M. Lee
(74) *Attorney, Agent, or Firm*—Steven Lin; Jack V. Musgrove (57) ABSTRACT

An adaptive circuit and method for separating luminance and chrominance components from a composite video signal by deriving three input lines from the composite video signal, determining whether any luminance similarity exists among the three input lines, and then selectively enabling a component filter based on any luminance similarity. If no luminance similarity exists among all three of the input lines, then a subtractive comb filter is enabled to maintain high vertical luminance resolution. If luminance similarity exists among all three of the input lines, then an additive comb filter is enabled. The additive comb filter performs three-line averaging when a high degree of similarity exists among all three consecutive input lines to minimize cross-chroma artifacts on lines that are similar. Chrominance similarity among the three input lines can also be determined by generating first and second chrominance values using different pairs of the three input lines, computing a difference of the first and second chrominance values, and comparing the chroma difference to a threshold value. If no luminance similarity exists between any of the three input lines or no chrominance similarity exists (i.e., there is vertical chroma transition), then a notch filter incorporated into the subtractive comb filter can be enabled.

39 Claims, 5 Drawing Sheets

ADAPTIVE CIRCUIT FOR Y-C SEPARATION

BACKGROUND OF THE INVENTION

1. Field of the Invention

The present invention generally relates to electronic video devices, and more particularly to a method of decoding or separating video signal components (i.e., chrominance and luminance) in a composite video signal.

2. Description of the Related Art

Various electronic video devices such as televisions, video cassette recorders and digital video disc (DVD) players utilize a composite video signal to record, transmit, and reproduce video images. The composite video signal typically includes a luminance (intensity) component denoted "Y" and a chrominance (color) component denoted "C". This type of video signal encoding is common to two well-known video standards, the National Television System Committee (NTSC) standard used in North America and Japan, and the Phase Alternating Line (PAL) standard used in most of Europe, Africa and Asia. The chrominance component of the signal is encoded on a subcarrier and added to the luminance signal. For NTSC, the chrominance is modulated on a subcarrier frequency of 3.579545 megahertz (MHz), and for PAL the chrominance is modulated on a subcarrier frequency of 4.433619 MHz, using quadrature modulation.

When the transmitted composite video signal is received at a video device, the luminance and chrominance components need to be separated out in order to determine their respective values and effectuate the color scheme. Many different video decoder designs have been devised for this purpose. Some of these decoders use one or more line delays and adders to cancel out the luminance component, and a bandpass filter to obtain the chrominance component. A conventional two-line delay YC separator circuit 10 for general viewing of a composite NTSC video signal is depicted in FIG. 1.

The composite video signal input of separator circuit 10 is fed to a first line delay 12 and an adder 14. The output of first line delay 12 passes to a second line delay 16 and two invert adders 18 and 20. The output of second line delay 16 passes to the other input of adder 14. Adder 14 generates a double-amplitude composite video signal since the subcarriers are in-phase. A divider 22 (i.e., 0.5 multiplier) is used to normalize the signal, which is then fed to the negative input of invert adder 18. Since a 180° phase difference exists between the output of adder 14 and the one line-delayed composite video signal, most of the luminance is canceled by adder 18, leaving double-amplitude chrominance. Another divider 24 is used to normalize the chrominance signal, which is then fed to a bandpass filter 26. The output of bandpass filter 26 is the chrominance output signal. This signal is also fed to the negative input of adder 20 to yield the luminance output signal.

Many composite video signal decoders use comb filters. Comb filters combine a scan line with one or more previous scan lines (scan lines are a horizontal line as displayed on a monitor or screen). Under the NTSC format, the chrominance phase changes 180° from one scan line to the next scan line. As a result, if two adjacent scan lines are identical, then adding them will eliminate the chrominance component, leaving only luminance. The same concept can be applied to PAL signals by using four line delays.

Figure 1:
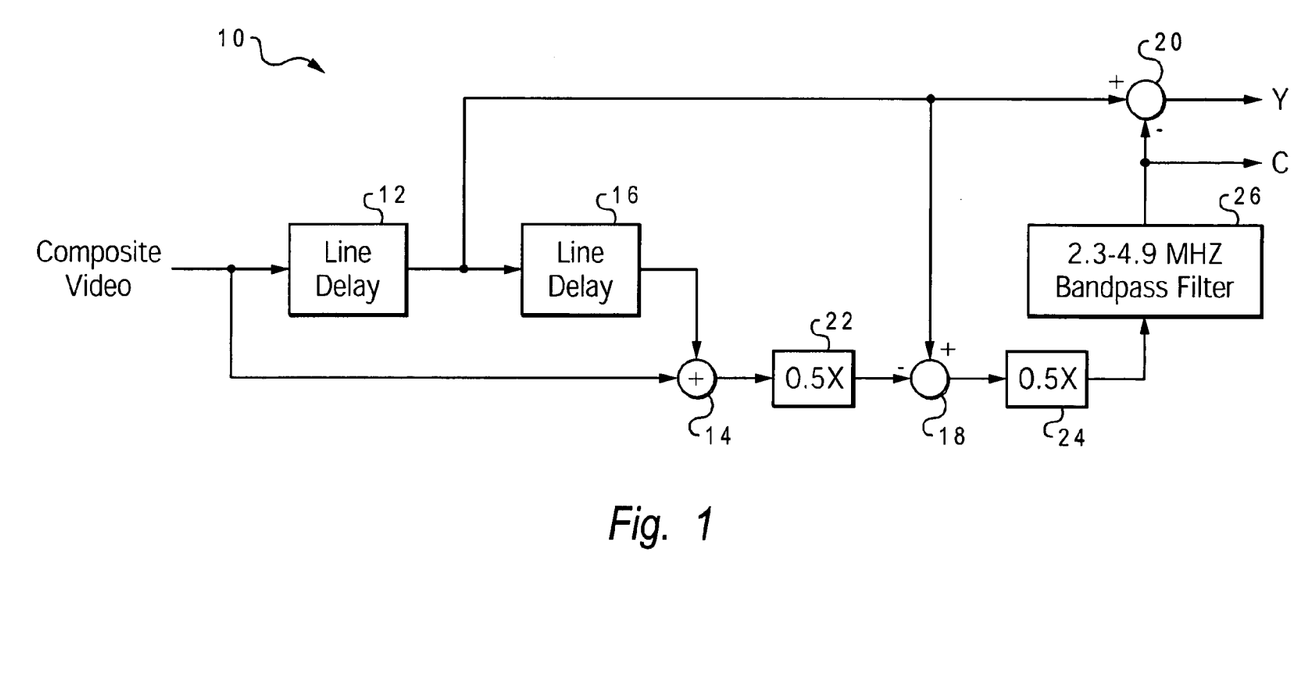
FIG. 1 is a high-level schematic diagram of a conventional two-line delay Y-C separator circuit for general viewing of a composite National Television System Committee (NTSC) video signal having luminance ("Y") and chrominance ("C") components.

Several disadvantages to line-delay circuits, such as that shown in FIG. 1 exist. A principal disadvantage is the unsuppressed cross-luminance on vertical color transitions, i.e., incorrect decoding of the luminance value due to abrupt color changes. Circuits that use comb filters can have further problems with diagonal lines and vertical color changes since only vertically-aligned samples are processed. Also, with diagonal lines, after standard comb filtering, the chrominance information includes the difference between adjacent luminance values, which may be misinterpreted as chrominance information. This difference can appear as cross-color artifacts along the edge of the line. Sharp vertical color transitions can further generate the "hanging dot" pattern commonly seen on the scan line between the two color changes.

Several different adaptive decoders have been designed which attempt to resolve these problems in Y-C separation. For example, U.S. Pat. No. 6,462,790 discloses a digital comb filter for decoding composite video signals which uses a fast Fourier transform circuit or band split filter circuit to determine characteristics of the input video signal without demodulating the signal. Those circuits produce signature signals, which are then used to correlate each of the video lines and compute weighting coefficients for a comb filter. The device uses the sum of four surrounding lines that are out of phase with the current line for comb filtering. The comb filter reverts to a band split filter if none of the surrounding lines are similar. The weighting coefficients can be adjusted as the noise level increases or decreases.

U.S. Patent Application Pub. No. 2002/0140866 discusses an adaptive comb filter design for separating chrominance and luminance components, which provides a threshold determination of whether the lines of chrominance are correlated, and uses a comb filter to separate out the Y-C information. If adjacent scan lines of chrominance contain the same color information or differ by only a slight level, the scan lines are considered correlated. If the lines are uncorrelated, then a bandpass filter is used to separate out the chrominance component from the composite video signal.

U.S. Patent Application Pub. No. 2002/0149702 describes another decoder for composite video signals, which prevents decreases in resolution at the time of Y-C separation associated with images having vertical stripes. A correlation judging section determines whether there is any correlation among neighboring signal lines, and one of two filters (either a two-line comb filter or a three-line comb filter) is selectively used depending on the correlation. A stripe component judging section examines neighboring pixels on the signal to indicate the presence of a stripe.

U.S. Patent Application Pub. No. 2003/0071921 teaches a luminance-chrominance signal separation device, which detects diagonal components of the luminance signal and then utilizes different bandpass filters to separate out the chrominance signal based on the amount of diagonal components in the luminance signal. Use of two different bandpass filters (a broad-bandpass filter and a narrow-bandpass filter) reduces cross-color in the output chrominance signal and improves resolution in the diagonal direction of the output luminance signal.

While each of these designs has certain advantages, they all still suffer from various limitations that are not addressed simply by the selective use of bandpass filters versus comb filters. It would, therefore, be desirable to devise an improved decoder for separating out luminance and chrominance values in a composite video signal, which more comprehensively addresses issues of vertical luminance resolution, cross-chrominance artifacts, and chrominance transitions. It would be further advantageous if the decoder could retain high quality transmission of signals with no chrominance content.

SUMMARY OF THE INVENTION

One object of the present invention is to provide an improved decoder for separating luminance and chrominance components in a composite video signal.

Another object of the present invention is to provide such a decoder which adaptively processes the composite video signal to minimize or reduce decoding errors from cross-chrominance artifacts or vertical luminance transitions.

Yet another object of the present invention is to provide a composite video signal decoder, which provides increased resolution of the luminance component.

The foregoing objects are achieved in an adaptive circuit and method which separates luminance and chrominance components from a composite video signal by deriving three input lines from the composite video signal, determining whether any similarities among the three input lines exist, and then selectively enabling one of a plurality of component filters based on any similarities. More particularly, the luminance similarity is determined by generating first and second luminance differences using different pairs of the three input lines, and comparing each of the luminance differences to a threshold value. If no luminance similarity exists among all three of the input lines, a subtractive comb filter is enabled to maintain high vertical luminance resolution. If luminance similarity does exist among all three of the input lines, an additive comb filter is enabled. The additive comb filter performs three-line averaging when a high degree of similarity exists among all three consecutive input lines to minimize cross-chroma artifacts on lines that are similar.

Chrominance similarity among the three input lines can also be determined by generating first and second chrominance values using different pairs of the three input lines, computing a difference of the first and second chrominance values, and comparing the chroma difference to a threshold value. If no luminance similarity exists between any of the three input lines or no chrominance similarity exists (i.e., vertical chroma transition exists), then a notch filter incorporated into the subtractive comb filter can be enabled.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 2:
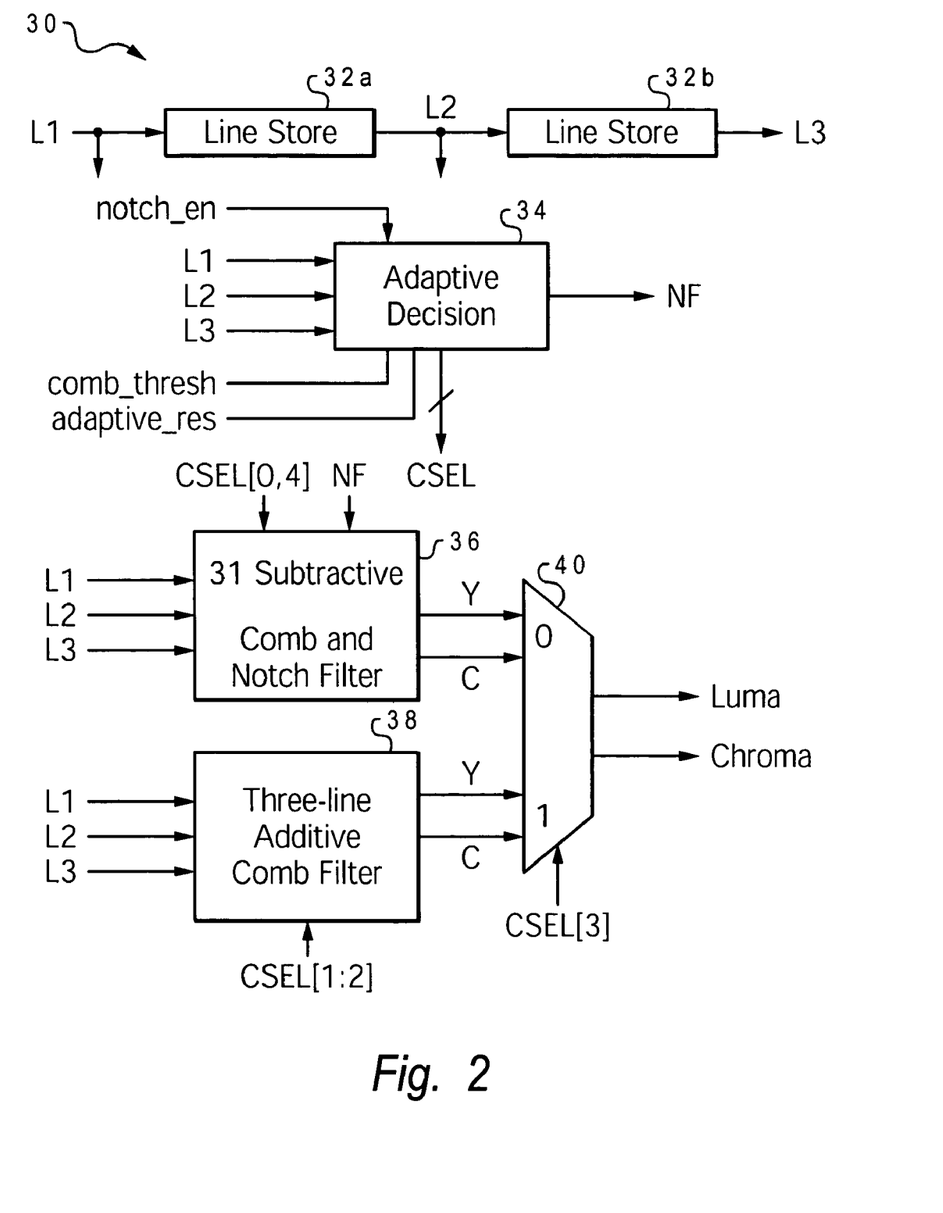
FIG. 2 is a high-level schematic diagram of one embodiment of an adaptive, three-line delay circuit for Y-C separation of an NTSC composite video signal constructed in accordance with the present invention.

With reference now to FIG. 2, one embodiment 30 of an adaptive circuit for Y-C separation of an NTSC composite video signal constructed in accordance with the present invention is depicted. Circuit 30 generally includes two delays or line stores 32*a* and 32*b*, an adaptive decision unit 34, a three-line subtractive comb and notch filter 36, a three-line additive comb filter 38, and a multiplexer 40. In the illustrative embodiment, circuit 30 is adapted to receive a digitized input of the composite video signal from a 10-bit analog-to-digital converter (not shown) as part of a larger video system, such as a digital video disc (DVD) player. The values in the digitized input stream are accordingly in the range of 0 to 1023. The three input lines L1, L2 and L3 are derived from consecutive scan lines using the two line stores 32*a* and 32*b*. Each line has 1440 samples. While this embodiment is designed for use in an NTSC system, those skilled in the art will appreciate that the invention is not so limited and could be applied to other systems, such as PAL. For use in a PAL system, the adaptive circuit could utilize four lines (three line stores) instead of three lines (two line stores).

As explained in further detail below, the behavior of circuit 30 adapts based on the content of the three input lines to yield high vertical luminance resolution, low cross-chrominance artifacts, and excellent transmission quality for signals with no chrominance content. The three input lines L1, L2 and L3 are passed to adaptive decision unit 34 as well as filters 36 and 38. Adaptive decision unit 34 generates five chrominance select (CSEL) signals and a notch filter (NF) signal which are used to control filters 36 and 38 and multiplexer 40. The NF and CSEL[0,4] signals control subtractive comb and notch filter 36, while the CSEL[1,2] signals control additive comb filter 38. The CSEL[3] signal controls multiplexer 40. Each of the filters 36, 38 has a pair of outputs representing the separated luminance (Y) and chrominance (C) components, and these component pairs are inputs to multiplexer 40, which merely acts to select one of these pairs based on the setting of CSEL[3]. Thus, the output of multiplexer 40 is the output of adaptive circuit 30, i.e., the decoded Y and C signals.

Figure 3:
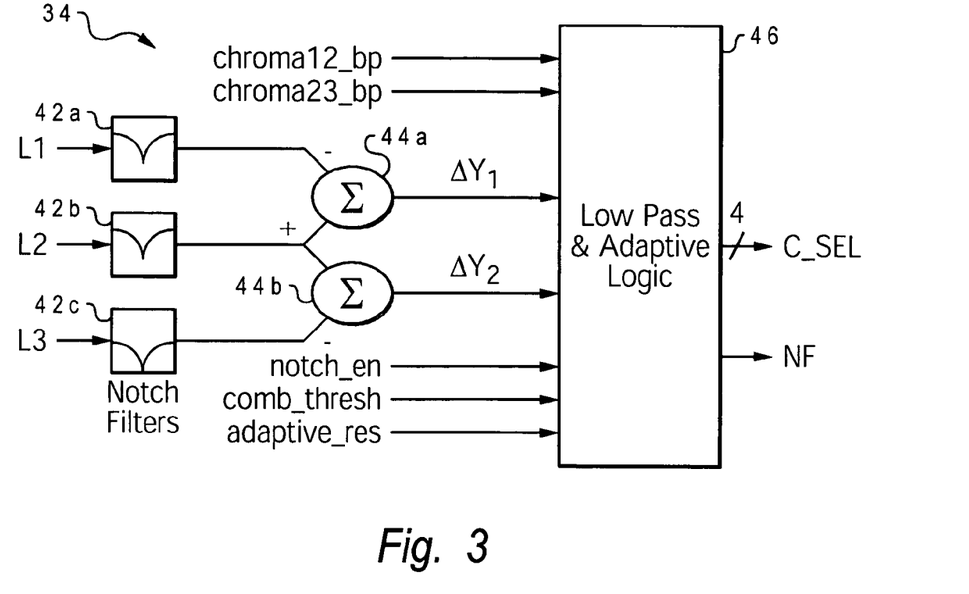
FIG. 3 is a schematic diagram illustrating the inputs to the adaptive decision logic used in the adaptive circuit of FIG. 2.

Adaptive decision unit 34 is shown in greater detail in FIG. 3. The input lines L1, L2, L3 pass through respective notch filters 42*a*, 42*b*, 42*c*. Each of the notch filters has a notch frequency of around 3.58 MHz to eliminate the chrominance component. The notch-filtered luminance of input line L1 is connected to the negative input of an invert adder 44*a*, and the notch-filtered luminance of input line L2 is connected to the positive input of invert adder 44*a*. The output of invert adder 44*a* generates a first luminance difference $\Delta Y_1$ (luminance of input line L2—luminance of input line L1). Similarly, the notch-filtered luminance of input line L3 is connected to the negative input of another invert adder 44*b*, and the notch-filtered luminance of input line L2 is connected to the positive input of invert adder 44*b*.

The output of invert adder 44b generates a second luminance difference $\Delta Y_2$ (luminance of input line L2—luminance of input line L3). Low-pass and adaptive logic 46 uses the luminance differences to determine the similarity between the luminance content of the three lines. If both of the differences are small (less than a threshold amount), then a high-degree of similarity exists between all three lines, and low-pass and adaptive logic 46 sets the NF and CSEL[ ] signals to enable use of additive comb filter 38. The luminance difference threshold amount may be hard wired but is preferably programmably set using another input (comb_thresh) to low-pass and adaptive logic 46. An exemplary threshold for luminance difference is 64 (decimal), an empirical value that represents a satisfactory cutoff for discriminating between similar versus dissimilar luminances. If either of the luminance differences are above the threshold, then they are further compared, and low-pass and adaptive logic 46 sets the NF and CSEL[ ] signals to enable use of subtractive comb filter 36, utilizing the lower difference of the two.

The similarity between chrominance components is also examined by low-pass and adaptive logic 46 to detect vertical chrominance transitions over three lines. First and second chrominance values chroma12_bp and chroma23_bp are generated by feeding first and second luminance differences $\Delta Y_1$ and $\Delta Y_2$ through a bandpass filter, which is discussed further below in conjunction with FIG. 5. If the difference between these values is more than a threshold value, then the NF signal is activated to select use of the notch filter. The same threshold value (comb_thresh) used for luminance similarity can be used for detecting vertical color transitions.

Circuit 30 can further be forced to use the notch filter regardless of any luminance or chrominance similarity by programmably setting an enable input signal notch_en. The extent of adaptiveness of the circuit (its resolution) can additionally be controlled using the "adaptive_res" signal.

Figure 4:
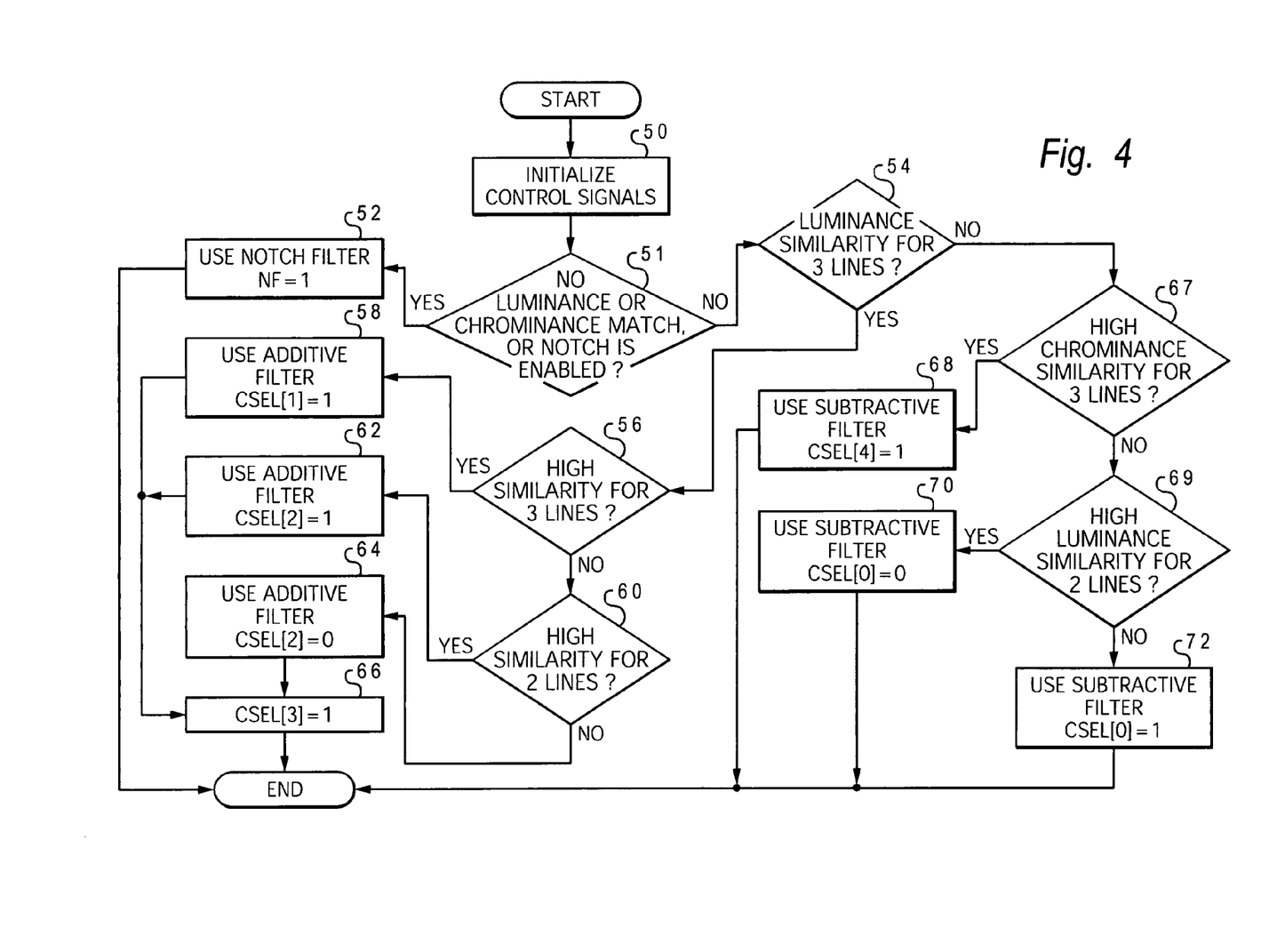
FIG. 4 is a chart illustrating the decision flow used by the adaptive decision logic of FIG. 3.

The operation of low-pass and adaptive logic 46 may be further understood with reference to the decision flowchart of FIG. 4. The process begins by initializing the control signals (CSEL, NF) to zero at block 50, and first determining whether a notch filter (in three-line subtractive comb and notch filter 36) should be used at block 51. The notch filter (92, see FIG. 5) is used when no luminance similarity exists (i.e., $\Delta Y_1$>comb_thresh and $\Delta Y_2$>comb_thresh) and no chrominance match exists (i.e., chroma12_bp–chroma23_bp<comb_thresh), or when the notch_en signal is active. If either of these conditions is satisfied, then the NF signal is turned on at block 52 (i.e., NF=1). If the notch filter is not to be used, then the next step from decision block 51 is to decide whether to use the additive filter 38 or the subtractive filter 36 by determining whether some luminance similarity exists between all three input lines L1, L2 and L3 at decision block 54. If luminance similarity exists between all three lines (i.e., $\Delta Y_1$<comb_thresh/2 and $\Delta Y_2$<comb_thresh/2), then the additive filter 38 is used, but if no similarity exists between all three lines, then the subtractive filter 36 is used instead.

If the additive filter 38 is to be used, then the next step from block 54 is to decide which set of lines to use for additive comb filtering by determining whether a high degree of luminance similarity exists between all three input lines at decision block 56. If a high degree of luminance similarity exists between all three lines (i.e., $\Delta Y_1$<comb_thresh/4 and $\Delta Y_2$<comb_thresh/4), then all three lines are used with additive comb filter 38 by setting CSEL[1]=1 at block 58. A three-line averager is used to minimize cross-chroma artifacts on similar lines. If a high degree of luminance similarity does not exist between all three lines, then the next step from decision block 56 is to decide whether a high degree of luminance similarity exists between at least two lines at decision block 60. If a high degree of luminance similarity exists between lines L1 and L2 (i.e., $\Delta Y_1$<comb_thresh/4), then CSEL[2] is set to 1 at block 62. If no high degree of luminance similarity exists between any of the lines, then CSEL[2] is set to 0 at block 64. For all cases that use the additive comb filter, CSEL[3] is also set to 1 at block 66.

Returning to decision block 54, if some luminance similarity does not exist across all three lines, then the subtractive comb datapath is used to maintain high vertical luminance resolution. Low-pass and adaptive logic 46 makes a determination of whether a high chrominance similarity exists across all three lines at decision block 67. If high chrominance similarity does exist (i.e., chroma12_bp–chroma23_bp<comb_thresh/2), then CSEL[4] is set to 1 at block 68. Low-pass and adaptive logic 46 makes a further determination of whether a high luminance similarity exists between at least lines L1 and L2 at decision block 69. If such a determination is made (i.e., $\Delta Y_1$<comb_thresh/2), then CSEL[0] is set to zero at block 70; otherwise CSEL[0] is set to 1 at block 72.

Figure 5:
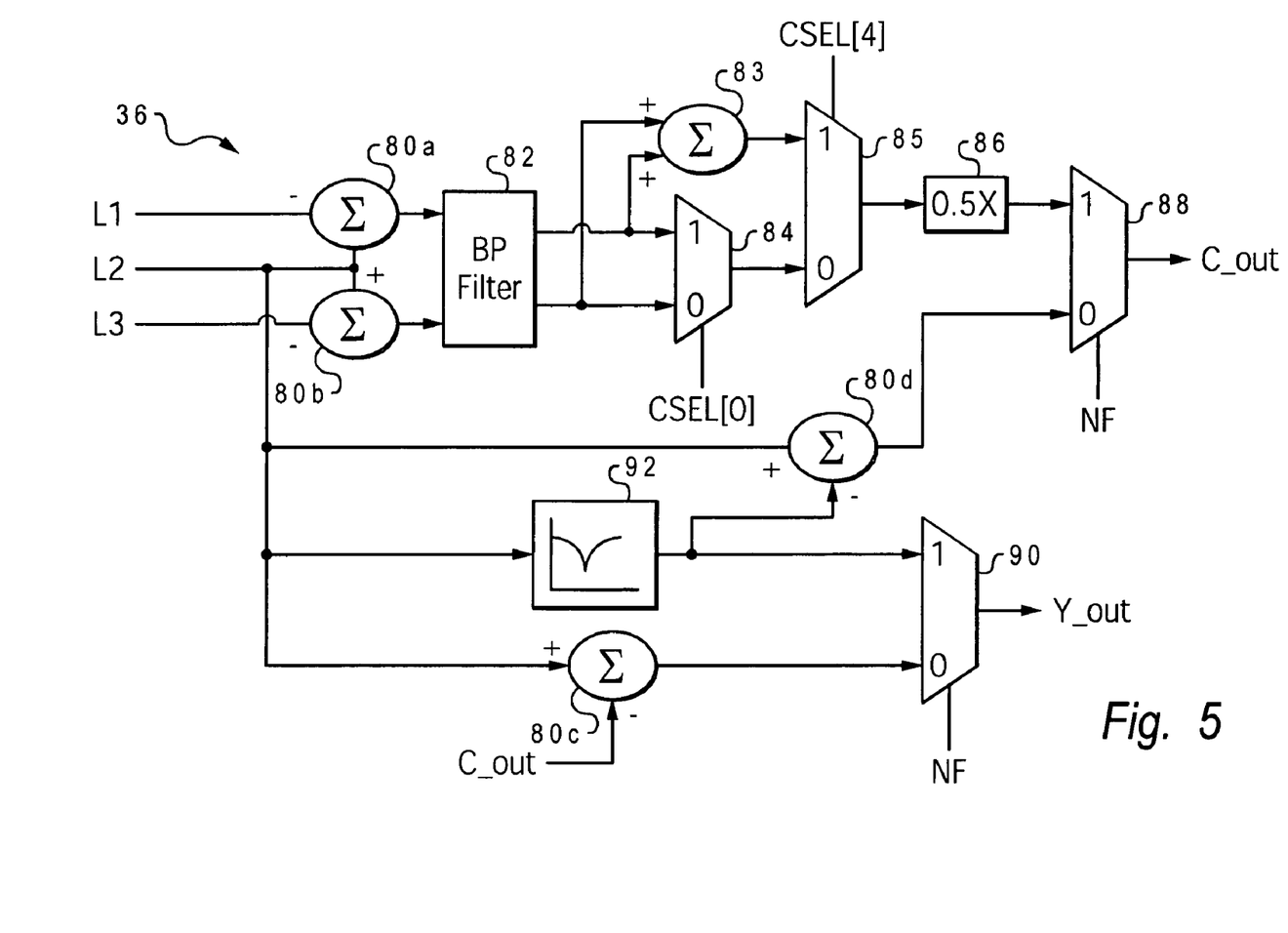
FIG. 5 is a schematic diagram showing one embodiment of the subtractive comb and notch filter used in the adaptive circuit of FIG. 2.

Subtractive comb and notch filter 36 is shown in further detail in FIG. 5. Input line L1 is connected to the negative input of an invert adder 80a, and input line L2 is connected to the positive input of invert adder 80a. Similarly, input line L3 is connected to the negative input of another invert adder 80b, and input line L2 is connected to the positive input of invert adder 80b. The outputs of adders 80a and 80b are then fed to a bandpass (BP) filter 82. The respective outputs of bandpass filter 82 form the chroma12_bp and chroma23_bp signals that are used by low-pass and adaptive logic 46. Those signals are also inputs to an adder 83 and to a multiplexer 84 which is controlled by CSEL[0]. The outputs of adder 83 and multiplexer 84 are inputs to another multiplexer 85 which is controlled by CSEL[4]. The output of multiplexer 85 is connected to a divider 86, which divides the doubled chrominance signals by two to derive the chrominance component. The output of divider 86 is further connected to one input of another multiplexer 88, which is controlled by the NF signal from low-pass and adaptive logic 46.

The output C_out of multiplexer 88 (the chrominance component) is connected to the negative input of another invert adder 80c, and input line L2 is connected to the positive input of invert adder 80c. The resulting luminance signal is connected to one input of another multiplexer 90, which is also controlled by the NF signal. The input line L2 is also connected to a notch filter 92, which passes the notch-filtered luminance signal to the other input of multiplexer 90, and to the negative input of another invert adder 80d. The original input line L2 is connected to the positive input of invert adder 80d, and the resulting output of invert adder 80d is only the chrominance component (since the luminance has been subtracted out), which is connected to the other input of multiplexer 88.

Figure 6:
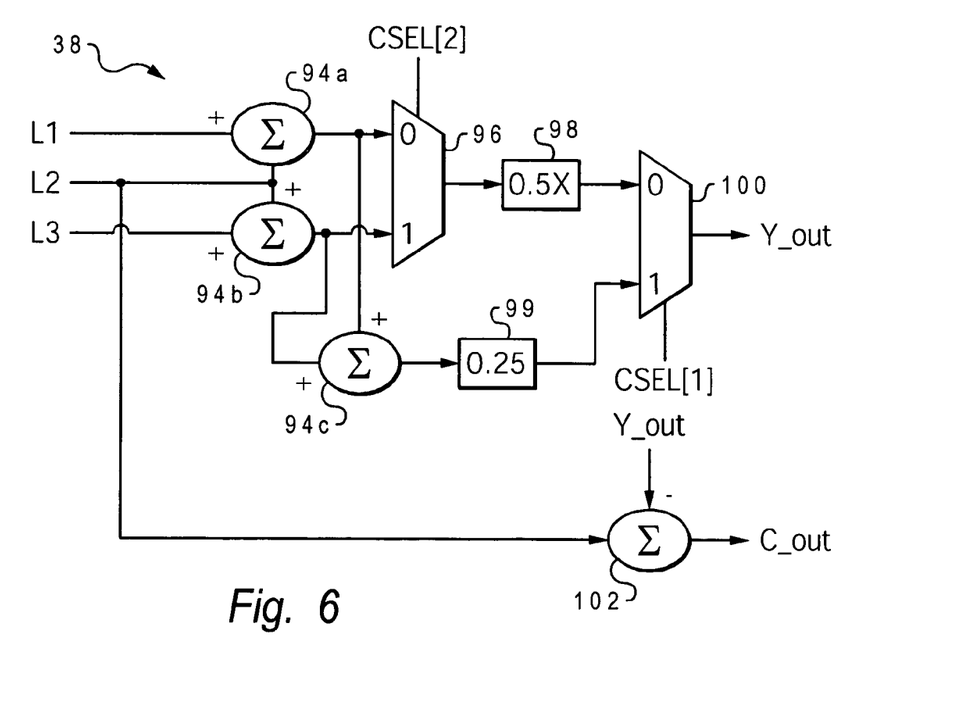
FIG. 6 is a schematic diagram depicting one embodiment of the additive comb filter used in the adaptive circuit of FIG. 2.

Additive comb filter 38 is shown in further detail in FIG. 6. Input line L1 is connected to one (positive) input of an adder 94a, and input line L2 is connected to the other (positive) input of adder 94a. Similarly, input line L3 is connected to one (positive) input of another adder 94b, and input line L2 is connected to the other (positive) input of adder 94b. The outputs of adders 94a and 94b are connected to respective inputs of a multiplexer 96, which is controlled by the CSEL[1] signal. The output of multiplexer 96 passes to a divider 98, which divides the doubled luminance signal by two. The output of divider 98 is further connected to one input of another multiplexer 100, which is controlled by the CSEL[2] signal. The output Y_out of multiplexer 100 is connected to the negative input of an invert adder 102, and input line L2 is connected to the positive input of invert adder 102. The resulting output of invert adder 102 is the chrominance signal (since the luminance Y_out was subtracted out). Input line L1 is also connected to one input of another adder 94c, and input line L3 is connected to the other input of adder 94c. The output of adder 94c is coupled to the other input of multiplexer 100 via another divider 99 which divides the luminance signal by 4 (0.25× gain).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of separating luminance and chrominance components from a composite video signal, comprising:
   deriving at least three consecutive input lines from a composite video signal;
   determining whether any similarity exists among the three consecutive input lines; and
   selectively enabling one of a plurality of component filters based on said determining to separate the luminance and chrominance components, wherein an additive comb filter is enabled when luminance similarity exists among all three consecutive input lines.

2. The method of claim 1 wherein determining whether any similarity exists further comprises determining whether any luminance similarity exists among the three consecutive input lines.

3. The method of claim 2 wherein determining whether any luminance similarity exists further comprises:
   generating a first luminance difference between a first one of the consecutive input lines and a second one of the consecutive input lines;
   generating a second luminance difference between the second consecutive input line and a third one of the consecutive input lines; and
   comparing each of the first and second luminance differences to a threshold value.

4. The method of claim 2 wherein determining whether any similarity exists further comprises determining whether any chrominance similarity exists among the three consecutive input lines.

5. The method of claim 4 wherein determining whether any chrominance similarity exists further comprises:
   generating a first chrominance value using a first one of the consecutive input lines and a second one of the consecutive input lines;
   generating a second chrominance value using the second consecutive input lines and a third one of the consecutive input lines;
   computing a difference of the first and second chrominance values; and
   comparing the difference to a threshold value.

6. The method of claim 1 wherein said additive comb filter performs three-line averaging when a high degree of similarity exists among all three consecutive input lines.

7. The method of claim 1 wherein selectively enabling one of the plurality of component filters further comprises enabling a subtractive comb filter when no luminance similarity exists among all three consecutive input lines.

8. The method of claim 1 wherein selectively enabling one of the plurality of component filters further comprises enabling a notch filter when no luminance similarity exists between any of the three consecutive input lines.

9. The method of claim 1 wherein selectively enabling one of the plurality of component filters further comprises enabling a notch filter when no chrominance similarity exists between the three consecutive input lines.

10. A method of separating luminance and chrominance components from a composite video signal, comprising:
    deriving a plurality of consecutive input lines from a composite video signal;
    determining whether any similarity exists between the consecutive input lines; and
    based on said determining, selectively enabling one filter among a notch filter, an additive comb filter, and a subtractive comb filter to separate the luminance and chrominance components.

11. The method of claim 10 wherein:
    deriving the plurality of consecutive input lines further comprises deriving at least three consecutive input lines from the composite video signal; and
    determining whether any similarity exists further comprises determining whether any similarity exists among the three consecutive input lines.

12. The method of claim 11 wherein determining whether any similarity exists further comprises determining whether any luminance similarity exists among the three consecutive input lines.

13. The method of claim 11 wherein determining whether any similarity exists further comprises determining whether any chrominance similarity exists among the consecutive input lines.

14. The method of claim 13 wherein selectively enabling one of the notch filter, the additive comb filter, or the subtractive comb filter further comprises enabling the additive comb filter when luminance similarity exists among all three consecutive input lines.

15. The method of claim 13 wherein selectively enabling one of the notch filter, the additive comb filter, or the subtractive comb filter further comprises enabling the subtractive comb filter when no luminance similarity exists among all three consecutive input lines.

16. The method of claim 11 wherein selectively enabling one of the notch filter, the additive comb filter, or the subtractive comb filter further comprises enabling the notch filter when no luminance similarity exists between the three consecutive input lines and no chrominance similarity exists between the three consecutive input lines.

17. An adaptive decision unit for controlling an electronic video decoder having a plurality of component filters which separate luminance and chrominance components from a composite video signal, the adaptive decision unit comprising:
    first, second, and third input lines;
    an adder circuit which generates first and second luminance differences based on said first, second, and third input lines, said adder circuit including first, second, and third notch filters connected respectively to said first, second and third input lines which produce first, second, and third notch-filtered luminance signals, a first invert adder having a negative input which receives the first notch-filtered luminance signal and a positive input which receives the second notch-filtered luminance signal, wherein the first invert adder generates the first luminance difference, and a second invert adder having another negative input which receives the third notch-filtered luminance signal and another positive input which receives the second notch-filtered luminance signal, wherein the second invert adder generates the second luminance difference; and a logic circuit which receives the first and second luminance differences and activates one or more output signals indicative of any luminance similarity among the first, second, and third input lines.

18. The adaptive decision unit of claim 17 wherein said logic circuit determines the luminance similarity by comparing the first and second luminance differences to a threshold value.

19. The adaptive decision unit of claim 18 wherein the threshold value is a programmably set value.

20. The adaptive decision unit of claim 17 wherein said logic circuit activates one of the one or more output signals to indicate that all three of said first, second, and third lines have some luminance similarity.

21. The adaptive decision unit of claim 20 wherein said logic circuit activates another one of the one or more output signals to indicate that all three of said first, second, and third lines have a high luminance similarity.

22. The adaptive decision unit of claim 20 wherein said logic circuit activates another one of the one or more output signals to indicate that at least two of said first, second, and third lines have a high luminance similarity.

23. The adaptive decision unit of claim 17, further comprising a filter circuit which generates first and second chrominance signals based on said first, second, and third input lines, wherein said logic circuit receives the first and second chrominance signals and activates one of the output signals to indicate that no luminance similarity exists among the first, second, and third input lines and that said first, second, and third lines have chrominance similarity.

24. The adaptive decision unit of claim 23 wherein said filter circuit includes:

a first invert adder having a negative input which receives the first input line and a positive input which receives the second input line;

a second invert adder having another negative input which receives the third input line and another positive input which receives the second input line; and a bandpass filter which receives outputs from said first and second invert adders and respectively generates the first and second chrominance signals.

25. A video decoder comprising:

one or more line stores which produce a plurality of input lines from a composite video signal;

a subtractive comb and notch filter which receives said input lines and generates a first pair of separated luminance and chrominance signals;

an additive comb filter which receives said input lines and generates a second pair of separated luminance and chrominance signals;

a multiplexer which receives the first and second pairs of separated luminance and chrominance signals and selectively outputs one of said pairs; and an adaptive decision unit which receives said input lines and controls said multiplexer based on any luminance similarity among said input lines.

26. The video decoder of claim 25 wherein said adaptive decision unit further enables notch filtering by said subtractive comb and notch filter when said input lines have no luminance similarity and no chrominance similarity.

27. The video decoder of claim 26 wherein said adaptive decision unit receives chrominance signals from one of said subtractive comb and notch filter or said additive comb filter.

28. The video decoder of claim 25 wherein:

two line stores produce first, second, and third input lines; and said adaptive decision unit determines any luminance similarity among all three of said first, second, and third input lines.

29. The video decoder of claim 28 wherein said adaptive decision unit controls said multiplexer to pass said first pair of separated luminance and chrominance signals when no luminance similarity exists among all three of said first, second, and third input lines, and to pass said second pair of separated luminance and chrominance signals when some luminance similarity exists among all three of said first, second, and third input lines.

30. The video decoder of claim 29 wherein said adaptive decision unit further controls said additive comb filter to perform three-line averaging when a high degree of similarity exists among all three of said first, second, and third input lines.

31. An adaptive circuit for separating luminance and chrominance components from a composite video signal comprising:

a first input line;

two line stores connected to said first input line which generate second and third input lines;

a subtractive comb filter which receives said first, second, and third input lines and generates a first pair of separated luminance and chrominance signals;

an additive comb filter which receives said first, second, and third input lines and generates a second pair of separated luminance and chrominance signals;

a multiplexer which receives the first and second pairs of separated luminance and chrominance signals and selectively outputs one of the first and second pairs; and an adaptive decision unit which receives said first, second, and third input lines and controls said multiplexer to pass said first pair of separated luminance and chrominance signals when no luminance similarity exists among all three of said first, second, and third input lines, and to pass said second pair of separated luminance and chrominance signals when some luminance similarity exists among all three of said first, second, and third input lines.

32. The adaptive circuit of claim 31 wherein said adaptive decision unit further controls said additive comb filter to perform three-line averaging when a high degree of similarity exists among all three of said first, second, and third input lines.

33. The adaptive circuit of claim 31 wherein said adaptive decision unit further determines any chrominance similarity among said first, second, and third input lines and enables notch filtering by said subtractive comb filter when said first, second, and third input lines have no luminance similarity and no chrominance similarity.

34. The adaptive circuit of claim 33 wherein said adaptive decision unit receives chrominance signals from one of said subtractive comb filter or said additive comb filter.

35. An adaptive decision unit for controlling an electronic video decoder having a plurality of component filters which separate luminance and chrominance components from a composite video signal, the adaptive decision unit comprising:
first, second, and third input lines;
a filter circuit which generates first and second chrominance signals based on said first, second, and third input lines;
an adder circuit which generates first and second luminance differences based on said first, second, and third input lines; and
a logic circuit which receives the first and second luminance differences and the first and second chrominance signals and activates one or more output signals to indicate that no luminance similarity exists among the first, second, and third input lines and that said first, second, and third lines have chrominance similarity.

36. The adaptive decision unit of claim 35 wherein said filter circuit includes:
a first invert adder having a negative input which receives the first input line and a positive input which receives the second input line;
a second invert adder having another negative input which receives the third input line and another positive input which receives the second input line; and
a bandpass filter which receives outputs from said first and second invert adders and respectively generates the first and second chrominance signals.

37. A method of separating luminance and chrominance components from a composite video signal, comprising:
deriving at least three consecutive input lines from a composite video signal;
determining whether any luminance similarity exists among the three consecutive input lines, and whether any chrominance similarity exists among the three consecutive input lines by generating a first chrominance value using a first one of the consecutive input lines and a second one of the consecutive input lines, generating a second chrominance value using the second consecutive input lines and a third one of the consecutive input lines, computing a difference of the first and second chrominance values, and comparing the difference to a threshold value; and
selectively enabling one of a plurality of component filters based on said determining to separate the luminance and chrominance components.

38. A method of separating luminance and chrominance components from a composite video signal, comprising:
deriving at least three consecutive input lines from a composite video signal;
determining whether any similarity exists among the three consecutive input lines; and
selectively enabling one of a plurality of component filters based on said determining to separate the luminance and chrominance components, wherein a notch filter is enabled when no luminance similarity exists between any of the three consecutive input lines.

39. A method of separating luminance and chrominance components from a composite video signal, comprising:
deriving at least three consecutive input lines from a composite video signal;
determining whether any similarity exists among the three consecutive input lines; and
selectively enabling one of a plurality of component filters based on said determining to separate the luminance and chrominance components, wherein a notch filter is enabled when no chrominance similarity exists between the three consecutive input lines.

* * * * *